United States Patent
Kim

(10) Patent No.: US 7,692,756 B2
(45) Date of Patent: *Apr. 6, 2010

(54) LIQUID CRYSTAL DISPLAY DEVICE AND METHOD OF FABRICATING THE SAME

(75) Inventor: Jong Woo Kim, Kyongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 808 days.

This patent is subject to a terminal disclaimer.

(21) Appl. No.: 11/050,794

(22) Filed: Feb. 7, 2005

(65) Prior Publication Data

US 2005/0134787 A1    Jun. 23, 2005

Related U.S. Application Data

(63) Continuation of application No. 10/319,630, filed on Dec. 16, 2002, now Pat. No. 6,864,946.

(30) Foreign Application Priority Data

Dec. 21, 2001    (KR) .......................... P2001-082739

(51) Int. Cl.
*G02F 1/1339* (2006.01)
(52) U.S. Cl. ...................... 349/156; 349/154
(58) Field of Classification Search ......... 349/153–157, 349/189–190
See application file for complete search history.

(56) References Cited

U.S. PATENT DOCUMENTS

| | | | |
|---|---|---|---|
| 3,978,580 A | 9/1976 | Leupp et al. .................. 29/886 |
| 4,094,058 A | 6/1978 | Yasutake | |
| 4,653,864 A | 3/1987 | Baron et al. ................ 349/156 |
| 4,691,995 A | 9/1987 | Yamazaki et al. ........... 349/189 |
| 4,775,225 A | 10/1988 | Tsuboyama et al. ......... 349/155 |
| 5,247,377 A | 9/1993 | Omeis | |
| 5,263,888 A | 11/1993 | Ishihara et al. ............... 445/25 |
| 5,379,139 A | 1/1995 | Sato et al. .................... 349/155 |
| 5,406,989 A | 4/1995 | Abe .............................. 141/7 |
| 5,499,128 A | 3/1996 | Hasegawa et al. ........... 349/155 |
| 5,507,323 A | 4/1996 | Abe ............................ 141/31 |
| 5,511,591 A | 4/1996 | Abe | |
| 5,539,545 A | 7/1996 | Shimizu et al. ............... 349/86 |
| 5,548,429 A | 8/1996 | Tsujita ....................... 349/187 |
| 5,642,214 A | 6/1997 | Ishii | |
| 5,680,189 A | 10/1997 | Shimizu et al. ............. 349/123 |

(Continued)

FOREIGN PATENT DOCUMENTS

EP    1 003 066 A1    5/2000

(Continued)

*Primary Examiner*—Dung T. Nguyen
(74) *Attorney, Agent, or Firm*—McKenna Long & Aldridge

(57) ABSTRACT

A liquid crystal display device and a method of fabricating the same are disclosed in the present invention. The liquid crystal display device includes first and second substrates including a plurality of liquid crystal display panel regions, each liquid crystal display panel region having an active region and a dummy region, a sealant outside the liquid crystal display panel regions, a dummy column spacer on the dummy region to control a liquid crystal flow, a buffer region between the sealant and the dummy column spacer to accommodate a liquid crystal, and a liquid crystal layer between the first and second substrates.

33 Claims, 12 Drawing Sheets

U.S. PATENT DOCUMENTS

| | | | |
|---|---|---|---|
| 5,742,370 A | 4/1998 | Kim | |
| 5,757,451 A | 5/1998 | Miyazaki et al. | 349/106 |
| 5,798,813 A | 8/1998 | Ohashi et al. | 349/154 |
| 5,852,484 A | 12/1998 | Inoue et al. | 349/86 |
| 5,854,664 A | 12/1998 | Inoue et al. | 349/92 |
| 5,861,932 A | 1/1999 | Inata et al. | 349/156 |
| 5,875,922 A | 3/1999 | Chastine | |
| 5,952,676 A | 9/1999 | Sato et al. | 257/59 |
| 5,956,112 A | 9/1999 | Fujimori et al. | 349/156 |
| 6,001,203 A | 12/1999 | Yamada et al. | 349/106 |
| 6,011,609 A | 1/2000 | Kato | |
| 6,016,178 A | 1/2000 | Kataoka | |
| 6,016,181 A | 1/2000 | Shimada | 349/156 |
| 6,055,035 A | 4/2000 | von Gutfeld | |
| 6,163,357 A | 12/2000 | Nakamura | |
| 6,219,126 B1 | 4/2001 | Von Gutfeld | 349/153 |
| 6,226,067 B1 | 5/2001 | Nishiguchi | |
| 6,236,445 B1 | 5/2001 | Foschaar et al. | 349/156 |
| 6,304,306 B1 | 10/2001 | Shiomi | |
| 6,304,311 B1 | 10/2001 | Egami | |
| 6,337,730 B1 | 1/2002 | Ozaki et al. | 349/156 |
| 6,414,733 B1 | 7/2002 | Ishikawa | |
| 6,705,584 B2 * | 3/2004 | Hiroshima et al. | 249/155 |
| 6,724,458 B2 | 4/2004 | Kim et al. | 349/156 |
| 6,864,946 B2 * | 3/2005 | Kim | 349/156 |
| 2003/0103185 A1 | 6/2003 | Kim et al. | 349/156 |

FOREIGN PATENT DOCUMENTS

| | | |
|---|---|---|
| JP | 51-65656 | 6/1976 |
| JP | 57-038414 | 3/1982 |
| JP | 57-38414 | 3/1982 |
| JP | 57-088428 | 6/1982 |
| JP | 57-88428 | 6/1982 |
| JP | 58-027126 | 2/1983 |
| JP | 58-27126 | 2/1983 |
| JP | 59-057221 | 4/1984 |
| JP | 59-195222 | 11/1984 |
| JP | 60-111221 | 6/1985 |
| JP | 60-164723 | 8/1985 |
| JP | 60-217343 | 10/1985 |
| JP | 61-7822 | 1/1986 |
| JP | 61-007822 | 1/1986 |
| JP | 61-55625 | 3/1986 |
| JP | 61-055625 | 3/1986 |
| JP | S62-054225 | 3/1987 |
| JP | S62-054228 | 3/1987 |
| JP | S62-054229 | 3/1987 |
| JP | 62-89025 | 4/1987 |
| JP | 62-089025 | 4/1987 |
| JP | 62-90622 | 4/1987 |
| JP | 62-090622 | 4/1987 |
| JP | 62-205319 | 9/1987 |
| JP | 63-109413 | 5/1988 |
| JP | 63-110425 | 5/1988 |
| JP | 63-128315 | 5/1988 |
| JP | 63-311233 | 12/1988 |
| JP | H03-009549 | 1/1991 |
| JP | H05-036425 | 2/1993 |
| JP | H05-036426 | 2/1993 |
| JP | H05-107533 | 4/1993 |
| JP | 5-127179 | 5/1993 |
| JP | 05-127179 | 5/1993 |
| JP | 05-154923 | 6/1993 |
| JP | 05-265011 | 10/1993 |
| JP | 5-265011 | 10/1993 |
| JP | 05-281557 | 10/1993 |
| JP | 5-281557 | 10/1993 |
| JP | 05-281562 | 10/1993 |
| JP | 10-333159 | 12/1993 |
| JP | H06-018829 | 1/1994 |
| JP | 6-51256 | 2/1994 |
| JP | 06-051256 | 2/1994 |
| JP | H06-064229 | 3/1994 |
| JP | 6-148657 | 5/1994 |
| JP | 06-148657 | 5/1994 |
| JP | 06-160871 | 6/1994 |
| JP | 6-160871 | 6/1994 |
| JP | H06-194637 | 7/1994 |
| JP | 6-235925 | 8/1994 |
| JP | 06-235925 | 8/1994 |
| JP | 06-265915 | 9/1994 |
| JP | 6-265915 | 9/1994 |
| JP | 06-313870 | 11/1994 |
| JP | 07-084268 | 3/1995 |
| JP | 07-128674 | 5/1995 |
| JP | 7-128674 | 5/1995 |
| JP | 07-181507 | 7/1995 |
| JP | 7-181507 | 7/1995 |
| JP | H07-275770 | 10/1995 |
| JP | H07-275771 | 10/1995 |
| JP | H08-076133 | 3/1996 |
| JP | 08-095066 | 4/1996 |
| JP | 8-95066 | 4/1996 |
| JP | 08-101395 | 4/1996 |
| JP | 8-101395 | 4/1996 |
| JP | 8-106101 | 4/1996 |
| JP | 08-106101 | 4/1996 |
| JP | H08-110504 | 4/1996 |
| JP | H08-136937 | 5/1996 |
| JP | 8-171094 | 7/1996 |
| JP | 08-171094 | 7/1996 |
| JP | 08-171097 | 7/1996 |
| JP | 8-190099 | 7/1996 |
| JP | 08-190099 | 7/1996 |
| JP | H08-173874 | 7/1996 |
| JP | 8-240807 | 9/1996 |
| JP | 08-240807 | 9/1996 |
| JP | 08-248427 | 9/1996 |
| JP | 09-005762 | 1/1997 |
| JP | 9-5762 | 1/1997 |
| JP | 09-026578 | 1/1997 |
| JP | 9-26578 | 1/1997 |
| JP | H09-001026 | 1/1997 |
| JP | 09-311340 | 2/1997 |
| JP | 09-61829 | 3/1997 |
| JP | 9-61829 | 3/1997 |
| JP | 9-73075 | 3/1997 |
| JP | 09-073075 | 3/1997 |
| JP | 9-73096 | 3/1997 |
| JP | 09-073096 | 3/1997 |
| JP | H09-094500 | 4/1997 |
| JP | 09-127528 | 5/1997 |
| JP | 9-127528 | 5/1997 |
| JP | 09-230357 | 9/1997 |
| JP | 9-230357 | 9/1997 |
| JP | 9-281511 | 10/1997 |
| JP | 09-281511 | 10/1997 |
| JP | 9-311340 | 12/1997 |
| JP | 10-123537 | 5/1998 |
| JP | 10-123538 | 5/1998 |
| JP | 10-142616 | 5/1998 |
| JP | 10-177178 | 6/1998 |
| JP | H10-174924 | 6/1998 |
| JP | 10-221700 | 8/1998 |
| JP | 10221700 | 8/1998 |
| JP | 5-281562 | 10/1998 |
| JP | 10-282512 | 10/1998 |
| JP | 10-333157 | 12/1998 |
| JP | 10-333159 | 12/1998 |
| JP | 11-014953 | 1/1999 |
| JP | 11-14953 | 1/1999 |
| JP | 11-38424 | 2/1999 |
| JP | 11-038424 | 2/1999 |

| | | | | | |
|---|---|---|---|---|---|
| JP | 11-64811 | 3/1999 | JP | 2001-281675 | 10/2001 |
| JP | 11-064811 | 3/1999 | JP | 2001-281678 | 10/2001 |
| JP | 11-109388 | 4/1999 | JP | 2001-282126 | 10/2001 |
| JP | 11-133438 | 5/1999 | JP | 2001-305563 | 10/2001 |
| JP | 11-142864 | 5/1999 | JP | 2001-330837 | 11/2001 |
| JP | 11142864 | 5/1999 | JP | 2001-330840 | 11/2001 |
| JP | 11-174477 | 7/1999 | JP | 2001-356353 | 12/2001 |
| JP | 11174477 | 7/1999 | JP | 2001-356354 | 12/2001 |
| JP | 11-212045 | 8/1999 | JP | 2002-014360 | 1/2002 |
| JP | 11212045 | 8/1999 | JP | 2002-14360 | 1/2002 |
| JP | 11-248930 | 9/1999 | JP | 2002-23176 | 1/2002 |
| JP | H11-262712 | 9/1999 | JP | 2002-023176 | 1/2002 |
| JP | H11-264991 | 9/1999 | JP | 2002-49045 | 2/2002 |
| JP | 11-326922 | 11/1999 | JP | 2002-049045 | 2/2002 |
| JP | 11-344714 | 12/1999 | JP | 2002-079160 | 3/2002 |
| JP | 2000-002879 | 1/2000 | JP | 2002-080321 | 3/2002 |
| JP | 2000-029035 | 1/2000 | JP | 2002-082340 | 3/2002 |
| JP | 2000-29035 | 1/2000 | JP | 2002-82340 | 3/2002 |
| JP | 2000-056311 | 2/2000 | JP | 2002-90759 | 3/2002 |
| JP | 2000-066165 | 3/2000 | JP | 2002-090759 | 3/2002 |
| JP | 2000-066218 | 3/2000 | JP | 2002-90760 | 3/2002 |
| JP | 2000-093866 | 4/2000 | JP | 2002-090760 | 3/2002 |
| JP | 2000-137235 | 5/2000 | JP | 2002-107740 | 4/2002 |
| JP | 2000-147528 | 5/2000 | JP | 2002-122870 | 4/2002 |
| JP | 2000-193988 | 7/2000 | JP | 2002-122872 | 4/2002 |
| JP | 2000-241824 | 9/2000 | JP | 2002-122873 | 4/2002 |
| JP | 2000-284295 | 10/2000 | JP | 2002-131762 | 5/2002 |
| JP | 2000-292799 | 10/2000 | JP | 2002-139734 | 5/2002 |
| JP | 2000-310759 | 11/2000 | JP | 2002-156518 | 5/2002 |
| JP | 2000-310784 | 11/2000 | JP | 2002-169166 | 6/2002 |
| JP | 2000-338501 | 12/2000 | JP | 2002-169167 | 6/2002 |
| JP | 2001-005401 | 1/2001 | JP | 2002-182222 | 6/2002 |
| JP | 2001-005405 | 1/2001 | JP | 2002-202512 | 7/2002 |
| JP | 2001-013506 | 1/2001 | JP | 2002-202514 | 7/2002 |
| JP | 2001-033793 | 2/2001 | JP | 2002-214626 | 7/2002 |
| JP | 2001-042341 | 2/2001 | JP | 2002-229042 | 8/2002 |
| JP | 2001-051284 | 2/2001 | JP | 2002-236276 | 8/2002 |
| JP | 2001-066615 | 3/2001 | JP | 2002-258299 | 8/2002 |
| JP | 2001-091727 | 4/2001 | JP | 2002-236292 | 9/2002 |
| JP | 2001-117105 | 4/2001 | JP | 2002-277865 | 9/2002 |
| JP | 2001-117109 | 4/2001 | JP | 2002-277866 | 9/2002 |
| JP | 2001-133745 | 5/2001 | JP | 2002-277881 | 9/2002 |
| JP | 2001-133794 | 5/2001 | JP | 2002-287156 | 10/2002 |
| JP | 2001-133799 | 5/2001 | JP | 2002-296605 | 10/2002 |
| JP | 2001-142074 | 5/2001 | JP | 2002-311438 | 10/2002 |
| JP | 2001-147437 | 5/2001 | JP | 2002-311440 | 10/2002 |
| JP | 2001-154211 | 6/2001 | JP | 2002-311442 | 10/2002 |
| JP | 2001-166272 | 6/2001 | JP | 2002-323687 | 11/2002 |
| JP | 2001-166310 | 6/2001 | JP | 2002-323694 | 11/2002 |
| JP | 2001-183683 | 7/2001 | JP | 2002-333628 | 11/2002 |
| JP | 2001-201750 | 7/2001 | JP | 2002-333635 | 11/2002 |
| JP | 2001-209052 | 8/2001 | JP | 2002-333843 | 11/2002 |
| JP | 2001-209056 | 8/2001 | JP | 2002-341329 | 11/2002 |
| JP | 2001-209057 | 8/2001 | JP | 2002-341355 | 11/2002 |
| JP | 2001-209058 | 8/2001 | JP | 2002-341356 | 11/2002 |
| JP | 2001-209060 | 8/2001 | JP | 2002-341357 | 11/2002 |
| JP | 2001-215459 | 8/2001 | JP | 2002-341358 | 11/2002 |
| JP | 2001-222017 | 8/2001 | JP | 2002-341359 | 11/2002 |
| JP | 2001-235758 | 8/2001 | JP | 2002-341362 | 11/2002 |
| JP | 2001-255542 | 9/2001 | KR | 2000-0035302 | 6/2000 |
| JP | 2001-264782 | 9/2001 | | | |
| JP | 2001-272640 | 10/2001 | | * cited by examiner | | and claims the benefit of the Korean patent Application No. P2001-082739 filed on Dec. 21, 2001, both of which is are hereby incorporated by reference in their entirety.

BACKGROUND OF THE INVENTION

1. Field of the Invention

The present invention relates to a display device, and more particularly, to a liquid crystal display device and a method of fabricating the same. Although the present invention is suitable for a wide scope of applications, it is particularly suitable for effectively controlling liquid crystal flow in fabricating a liquid crystal display.

2. Discussion of the Related Art

In general, applications of liquid crystal display devices have characteristics, such as full color realization, low voltage operation, low power consumption, thinness, lightness in weight, and high image quality. Thus, its applications have been diversified from monitors for electronic watches, calculators, notebook computers, personal computers and TV's, and monitors for aviation gauges, personal digital assistants (PDA's), and mobile stations.

A method of forming a liquid crystal layer is largely classified into two methods, such as a liquid crystal injection method and a liquid crystal dispensing method. As a panel of the liquid crystal display device becomes larger in size, the liquid crystal dispensing method is mostly used in fabricating the liquid crystal display device. This is because the liquid crystal injection method takes more time to inject the liquid crystal between first and second substrates. In the liquid crystal dispensing method, liquid crystal droplets are dispensed on one of the first and second substrates, and then the substrates are bonded to each other to form the liquid crystal layer.

When the liquid crystal is injected between the first and second substrates, a thermo-hardening sealant is usually used. For instance, epoxy resin is mixed with amine or amide in order to form a thermo-hardening sealant. The thermo-hardening sealant is hardened by applying heat to the sealant for about one or two hours at a temperature of about 100□, so that contamination of the liquid crystal may occur due to a long hardening time period. In the liquid crystal dispensing method, the first and second substrates are attached to each other with a photo-hardening sealant. In this case, the photo-hardening sealant is a mixture of a hardener and acryl resin. When UV-ray is irradiated to the sealant, the hardener becomes a radical, and then the radical acts with the acryl resin, so that the acryl resin is activated. Accordingly, the mixture is polymerized so that adhesion of the sealant is improved. After forming the liquid crystal layer between the first and second substrates, the UV-ray is irradiated to the attached substrates in order to harden the sealant between the first and second substrates for several seconds. In addition, a ball spacer is used between the first and second substrates so as to maintain a cell gap in the liquid crystal injection method. Meanwhile, a column spacer is used between the first and second substrates so as to maintain a cell gap in the liquid crystal dispensing method.

A related art liquid crystal display device and a method of fabricating the same will be explained with reference to the accompanying drawings.

FIG. 1 is a plane view of a liquid crystal display device according to a related art liquid crystal dispensing method. FIGS. 2A to 2G are plane views illustrating process steps of fabricating a liquid crystal display device according to a related art liquid crystal dispensing method.

In FIG. 1, a plurality of gate lines 80 and a plurality of data lines 90 are formed to cross one another in an active region 120 of a thin film transistor array substrate (i.e., a first substrate) 100, thereby defining a plurality of pixel regions. A pixel electrode 112 is formed at each pixel region. A plurality of thin film transistors (not shown) are formed at each corresponding crossing point of the gate and data lines 80 and 90 so as to apply signals of the data lines to each pixel electrode 112 according to signals of the gate lines. Then, the liquid crystal (not shown) is dispensed on the first substrate 100.

Next, a color filter array substrate (i.e., a second substrate) 150 includes column spacers, a black matrix layer 130, and a photo-hardening sealant. In this case, the column spacers 105 are formed on the second substrate 150 so as to maintain a cell gap between the first and second substrates 100 and 150. The black matrix layer 130 is formed in the periphery of the active region 120. The photo-hardening sealant 110 surrounding the black matrix layer 130 is formed in the periphery of the black matrix layer 130 so as to attach the first and second substrates 100 and 150 to each other. After attaching the first and second substrates 100 and 150 to each other with the photo-hardening sealant 110, UV-ray is irradiated to the attached substrates from the top of the second substrate 150 for hardening the photo-hardening sealant 110, thereby bonding the first and second substrates to each other.

At this time, there may occur imperfect or excessive filling of the liquid crystal if the exact amount of the liquid crystal is not dispensed on the substrates. When the amount of the liquid crystal dispensed on the substrate is less than the required amount, it takes time to spread the liquid crystal from the center of the substrate to the corner regions, such as the farthest spots. As a result, a tilt angle of the liquid crystal may be changed since a contaminant is accumulated on the liquid crystal display panel. On the other hand, when too much liquid crystal is dispensed on the substrate, spots may appear on the liquid crystal display panel due to a problem in the spacer for maintaining a cell gap between the first and second substrates.

A method of fabricating a liquid crystal display device according to a related art liquid crystal dispensing method will be explained in detail.

FIGS. 2A to 2G are plane views illustrating fabricating process steps of a liquid crystal display device according to a related art liquid crystal dispensing method. In the liquid crystal display device according to the related art liquid crystal dispensing method, a plurality of liquid crystal display panel regions are formed on first and second substrates. A thin film transistor array and a color filter array are respectively formed on the first and second substrates. Then, a liquid crystal is dispensed on the substrate, and a sealant is deposited thereon. After attaching the substrates to each other, each substrate is cut into unit liquid crystal display panel regions, thereby forming the liquid crystal display panel regions on each substrate.

More specifically, in FIG. 2A, a plurality of gate lines (not shown) are formed on the first substrate 100, and a plurality of data lines (not shown) are formed on the first substrate 100 to cross one another, thereby defining a plurality of pixel regions. A pixel electrode (not shown) is formed at each pixel region, and the thin film transistors (not shown) are formed at each crossing point of the gate and data lines for applying signals of the data lines to each pixel electrode according to signals of the gate lines. Also, a common line (not shown) is formed for applying a voltage to a common electrode. In this case, a plurality of liquid crystal display panel regions 99 are formed on the first substrate 100. Then, a plurality of silver (Ag) dots 101 are formed on the common line of each liquid crystal display panel region 99 to provide an electrical connection to the common line. The liquid crystal 103 is appropriately dispensed on each liquid crystal display panel region 99 of the first substrate 100.

As shown in FIG. 2B, a black matrix layer (not shown), a color filter layer (not shown), and a common electrode (not shown) are formed on the second substrate 150. A column spacer 105 is formed on each liquid crystal display panel region 99 of the second substrate 150 corresponding to the gate and data lines of the first substrate 100. Then, a photo-hardening sealant 110 is formed in the periphery of each liquid crystal display panel region 99 of the second substrate 150, as shown in FIG. 2C.

In FIG. 2D, the first substrate 100 is placed under the second substrate 150. The first and second substrates 100 and 150 are loaded to a bonding apparatus with a controllable vacuum chamber. The surface of the second substrate 150, on which the sealant 110 is deposited, faces down, and then is fixed to an upper stage 170 that moves along the Z-axis direction (i.e., vertical direction). Also, the first substrate 100 is fixed to a lower stage 160 that moves along the XY-axis direction (i.e., horizontal direction). After that, the second substrate 150 fixed to the upper stage 170 and the first substrate fixed to the lower stage 160 are aligned, and the chamber of the bonding apparatus is in a vacuum condition, thereby attaching the first and second substrates 100 and 150 to each other, as shown in FIG. 2E. Then, the first and second substrates are attached to each other with a first gap.

Subsequently, as shown in FIG. 2F, gas or dry air is provided to the chamber of the bonding apparatus under a vacuum condition so as to equalize the pressure of the chamber with the atmospheric pressure. Accordingly, the first and second substrates attached by the sealant 110 are maintained under vacuum, and the circumferential area of the substrates is under the atmospheric pressure, so that the first and second substrates are pressed to each other due to a pressure difference between the inside pressure of the substrates and the atmospheric pressure. Simultaneously, the liquid crystal 103 spreads out on the entire liquid crystal display panel between the first and second substrates, thereby forming a liquid crystal layer 103a. Then, the UV-ray is irradiated to the attached substrates from the top of the second substrate 150, thereby hardening the photo-hardening sealant 110.

However, the related art liquid crystal display device according to the liquid crystal dispensing method and the method of fabricating the same have the following disadvantages.

When the dispensed amount of the liquid crystal is too much on the substrate, a uniform cell gap cannot be maintained between the first and second substrates since a buffer region, in which the liquid crystal may move around, cannot be formed in the liquid crystal display device when the substrates are attached to each other. On the other hand, when the dispensed amount of the liquid crystal is not enough on the substrate, it is difficult to regulate the liquid crystal flow in the related art liquid crystal display device since the buffer region cannot be formed therein.

SUMMARY OF THE INVENTION

Accordingly, the present invention is directed to a liquid crystal display device and a method of fabricating the same that substantially obviates one or more of problems due to limitations and disadvantages of the related art.

Another object of the present invention is to provide a liquid crystal display device and a method of fabricating the same that enables to regulate a liquid crystal flow even when the dispensed amount of the liquid crystal is too excessive or not enough on the liquid crystal panel.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, a liquid crystal display device includes first and second substrates including a plurality of liquid crystal display panel regions, each liquid crystal display panel region having an active region and a dummy region, a sealant outside the liquid crystal display panel regions, a dummy column spacer on the dummy region to control a liquid crystal flow, a buffer region between the sealant and the dummy column spacer to accommodate a liquid crystal, and a liquid crystal layer between the first and second substrates.

In another aspect of the present invention, a method of fabricating a liquid crystal display device includes forming a buffer region at a dummy region of a plurality of liquid crystal display panel regions on a first substrate, each liquid crystal display panel region having active and dummy regions, forming a liquid crystal on the active region, forming a dummy column spacer for controlling a liquid crystal flow on a dummy region of a plurality of liquid crystal display panel regions on a second substrate, each liquid crystal display panel region having active and dummy regions, forming a sealant outside the liquid crystal display panel region of one of the first and second substrates, and bonding the first and second substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention.

In the drawings.

DETAILED DESCRIPTION OF THE ILLUSTRATED EMBODIMENTS

Reference will now be made in detail to the illustrated embodiments of the present invention, examples of which are illustrated in the accompanying drawings. Wherever possible, the same reference numbers will be used throughout the drawings to refer to the same or like parts.

Figure 1:
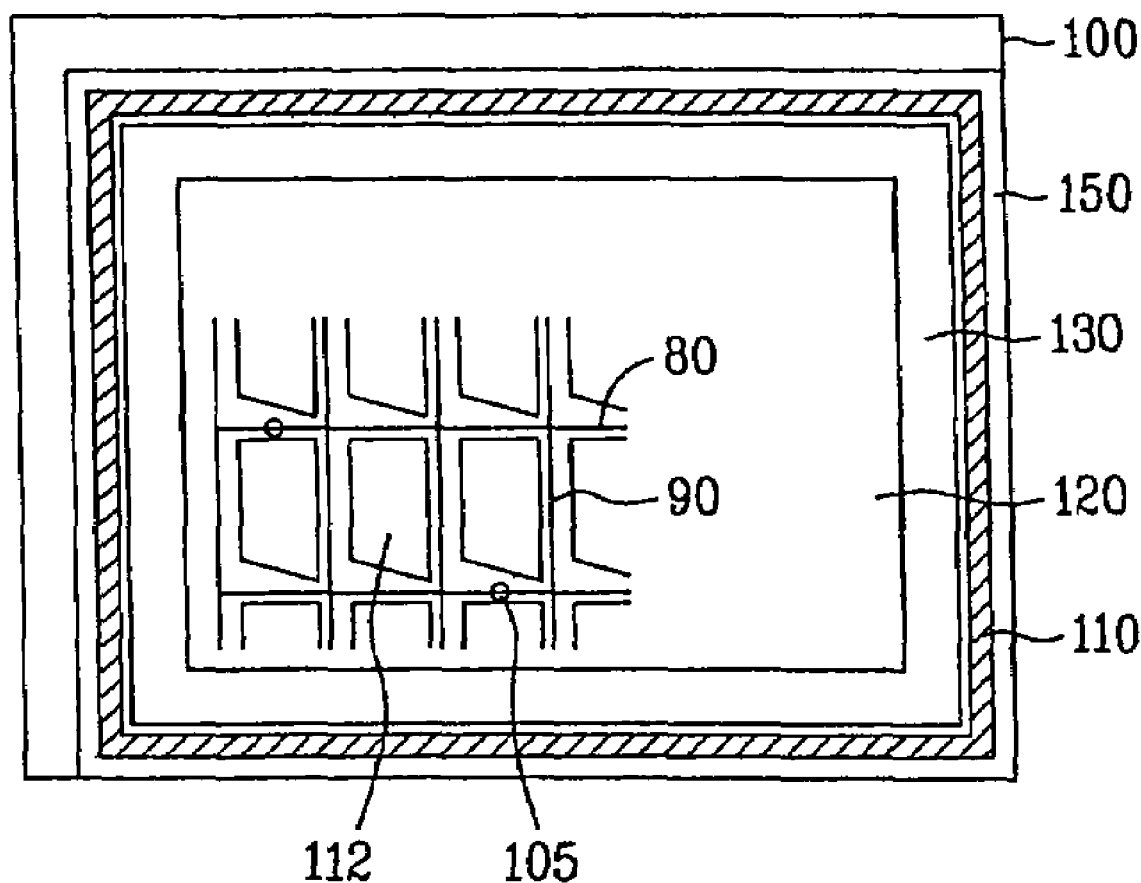
FIG. 1 is a plane view of a liquid crystal display device according to a related art liquid crystal dispensing method.
Figure 2A:
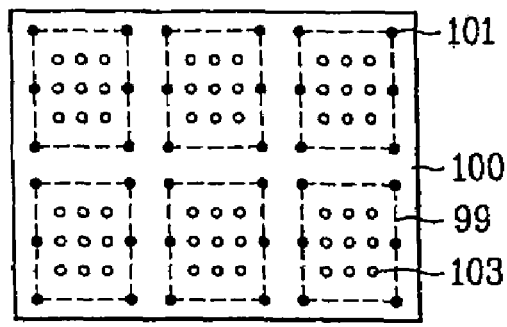
FIGS. 2A to 2G are cross-sectional views illustrating process steps of fabricating a liquid crystal display device according to the related art liquid crystal dispensing method.
Figure 2B:
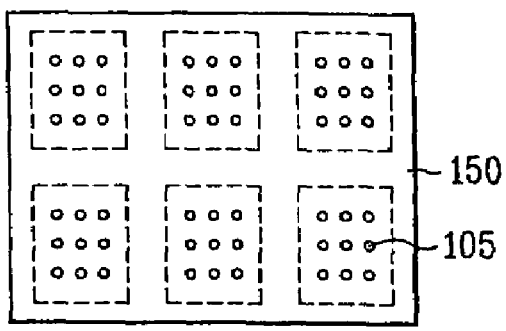
Figure 2C:
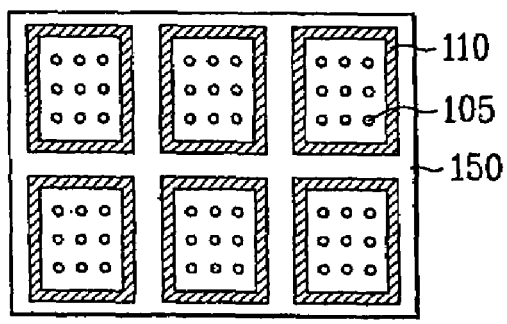
Figure 2D:
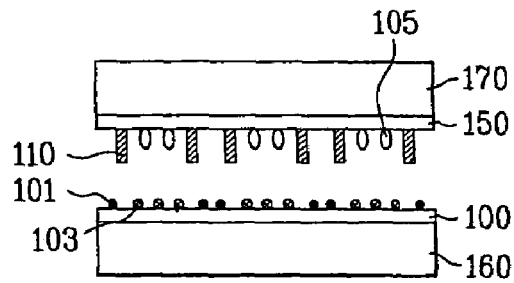
Figure 2E:
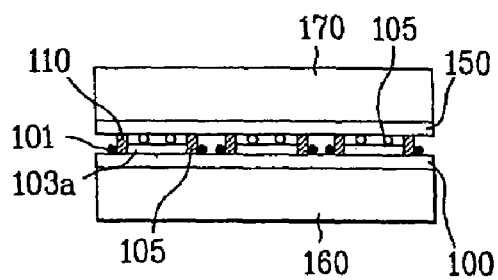
Figure 2F:
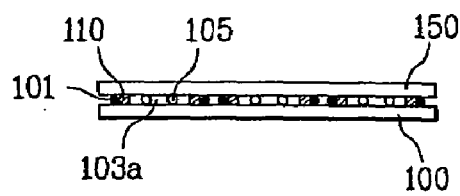
Figure 2G:
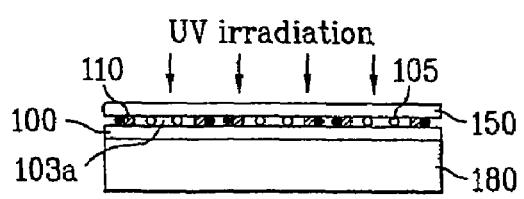
Figure 3:
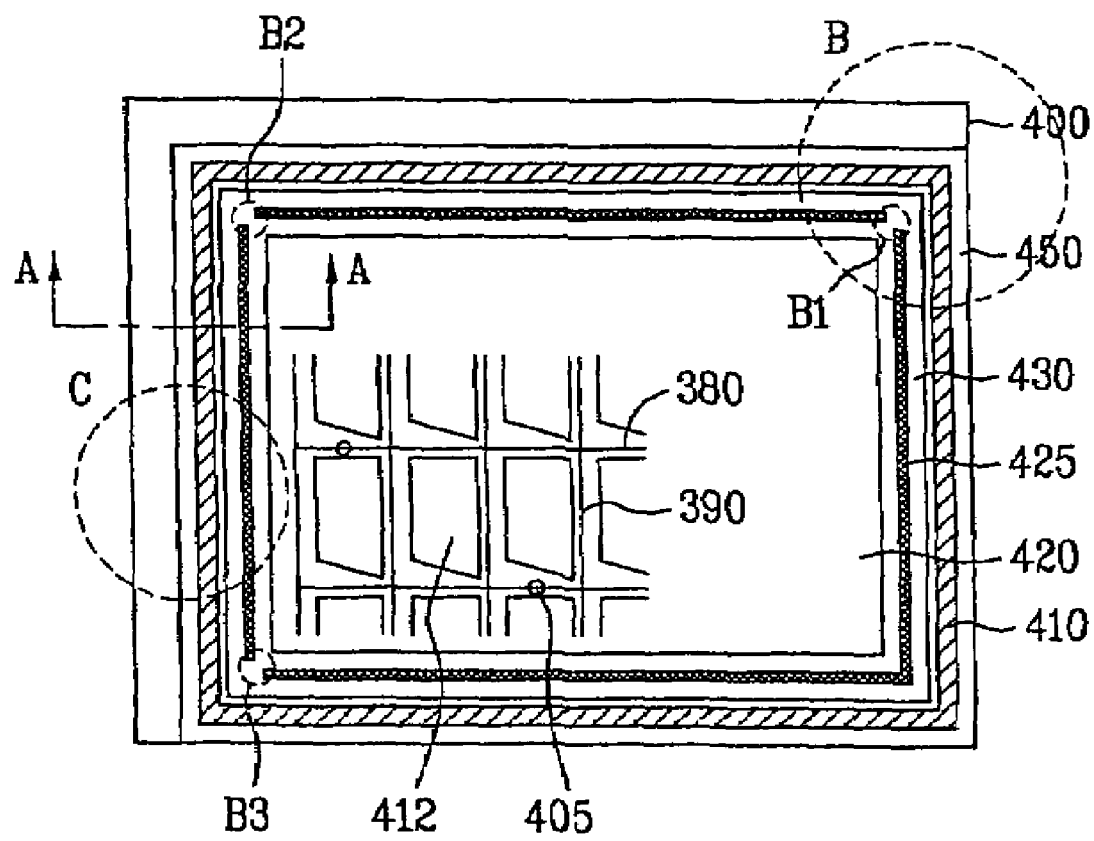
FIG. 3 is a plane view of a liquid crystal display device according to a liquid crystal dispensing method of the first embodiment of the present invention.
Figure 4A:
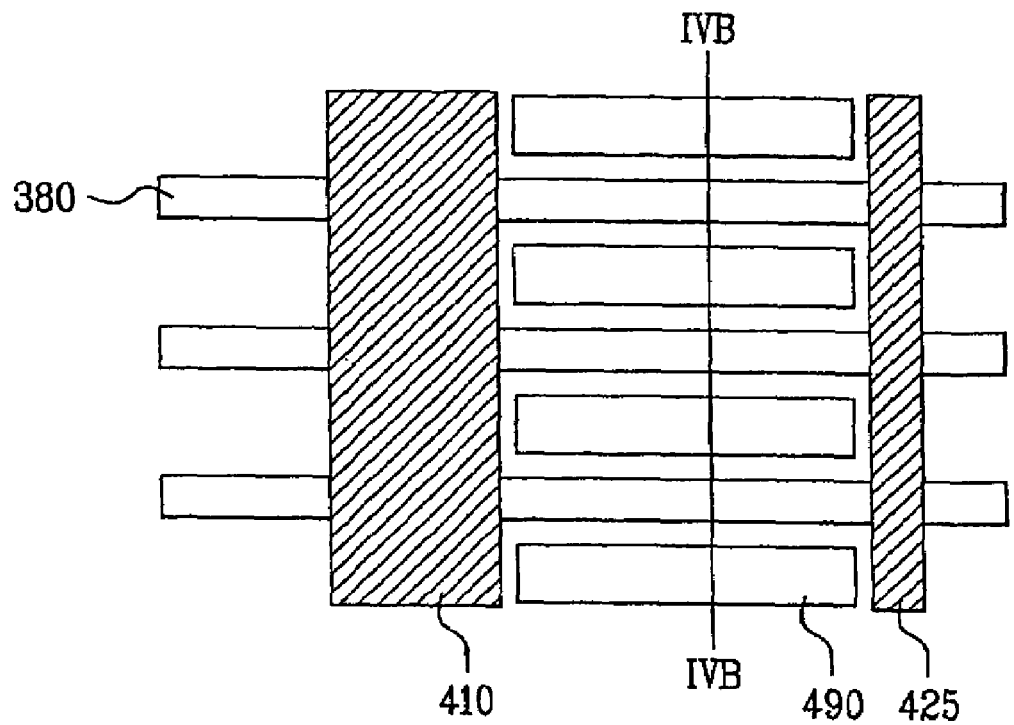
FIG. 4A is an enlarged view of "C" portion of FIG. 3 so as to explain a sealant and a dummy column spacer in a liquid crystal display device according to the first embodiment of the present invention.
Figure 4B:
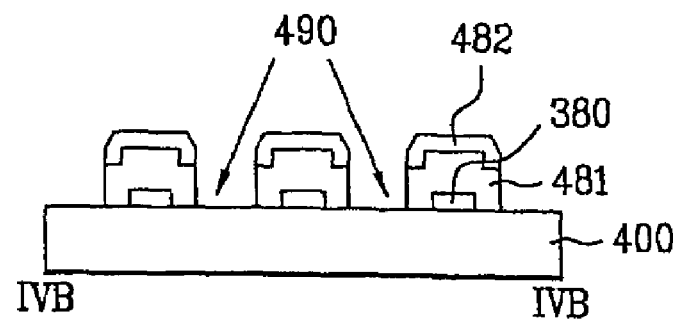
FIG. 4B is a cross-sectional view of a liquid crystal display device taken along line IVB—IVB of FIG. 4A.

FIG. 3 is a plane view of a liquid crystal display device according to a liquid crystal dispensing method of a first embodiment of the present invention. FIG. 4A is an enlarged view of "C" portion of FIG. 3 so as to explain a sealant and a dummy column spacer in the liquid crystal display device according to the first embodiment of the present invention. FIG. 4B is a cross-sectional view of the liquid crystal display device taken along line IVB—IVB of FIG. 4A.

As shown in FIG. 3, a plurality of gate and data lines 380 and 390 are formed to cross one another in an active region 420 of a thin film transistor array substrate (a first substrate) 400, thereby forming a plurality of pixel regions. A pixel electrode 412 is formed at each pixel region, and a plurality of thin film transistors (not shown) are formed at each crossing point of the gate and data lines 380 and 390 so as to apply signals of the data lines to each pixel electrode 412 according to signals of the gate lines. Then, a liquid crystal (not shown) is dispensed on the first substrate 400. The thin film transistor array substrate 400 has a plurality of liquid crystal panels regions, each having an active region and a dummy region.

Subsequently, a black matrix layer 430, column spacers, and a photo-hardening sealant 410 are formed on the surface of a color filter array substrate (a second substrate) 450, which faces to the first substrate. The color filter array substrate 450 has a plurality of liquid crystal display panel regions, each having an active region and a dummy region. At this time, the black matrix layer 430 is formed outside the active region 420 on the second substrate 450 (for example, in the periphery of the active layer). The column spacers 405 are formed in the active region 420 of the second substrate 450 SO as to maintain a cell gap between the first and second substrates 400 and 450. The photo-hardening sealant 410 is formed outside and surrounds the black matrix layer 430 so as to attach the first and second substrates 400 and 450 to each other. Then, a dummy column spacer 425 is formed on the black matrix layer 430. In this case, the column spacers 405 and the dummy column spacer 425 are made of an organic resin material or a photosensitive material. The column spacers 405 are formed on the second substrate 450 to correspond to the gate and data lines of the first substrate 400 except for the pixel regions to have a thickness in the range of about 5 and 30□. The photo-hardening sealant 410 may shrink during hardening, so that a mixture of a photo-hardening sealant and a thermo-hardening sealant may be used instead of using a single photo-hardening sealant. Also, the sealant 410 may be wider or narrower than the black matrix layer 430 in width.

Also, the dummy column spacer 425 has openings to effectively regulate a liquid crystal flow. For example, there may be openings at three corner regions of the second substrate 450 and no opening at one corner region. Each opening has a different size. Thus, the liquid crystal flows toward three corner regions B1, B2, and B3 of the second substrate 450 from the one corner region without an opening. Also, the liquid crystal flows toward the two corner regions B2 and B3 of the second substrate 450 from the corner region B1 having an opening smaller than those of the regions B2 and B3. The liquid crystal flows toward the one of the two corner regions B2 and 13 of the second substrate 450 from whichever the corner region having a smaller sized opening. And finally, the liquid crystal flows out of the liquid crystal display panel at the corner region having the largest sized opening, thereby forming a uniform liquid crystal layer. Subsequently, the first and second substrates 400 and 450 are attached to each other with the photo-hardening sealant 410. Then, UV-ray is irradiated to the first and second substrate from a top of the second substrate 450 so as to harden the photo-hardening sealant 410, thereby bonding the first and second substrates 400 and 450 to each other.

As shown in FIGS. 4A and 4B, a gate insulating layer 481 and a passivation layer 482 are selectively removed between the photo-hardening sealant 410 and the dummy column spacer 425, thereby forming a buffer region 490 for filling a liquid crystal therein. In other words, portions of the gate insulating layer 481 and the passivation layer 482 are selectively removed between the gate and data lines of the first substrate 400. At this time, the buffer region 490 is used as a space to accommodate the liquid crystal when the liquid crystal is excessively dispensed on the substrate. If the amount of the liquid crystal on the substrate is not enough, the buffer region 490 acts to guide the liquid crystal. The dummy column spacer may be formed in a different way in the liquid crystal display device having the aforementioned structure according to the first embodiment of the present invention.

Figure 5:
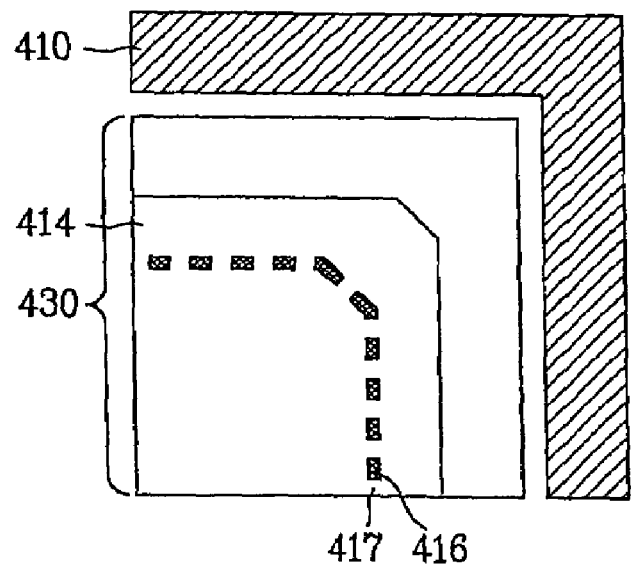
FIG. 5 is an enlarged view of "B" portion of FIG. 3 so as to explain a dummy column spacer in a liquid crystal display device according to a second embodiment of the present invention.

FIG. 5 is an enlarged view of "B" portion of FIG. 3 so as to explain a dummy column spacer in a liquid crystal display device according to a second embodiment of the present invention. In the liquid crystal display device according to the second embodiment of the present invention, a dummy column spacer 416 for regulating a liquid crystal flow is formed on a black matrix layer 430, and an alignment layer 414 is formed on the second substrate 450 including the dummy column spacer 416. The dummy column spacer 416 is formed to have a plurality of openings 417 and is made of an organic resin material or a photosensitive material. The dummy column spacer 416 may be formed with the column spacer 405 simultaneously, or separately. Although not shown in FIG. 5, an overcoat layer may be formed on the black matrix layer 430, and the dummy column spacer 416 may be formed on the overcoat layer.

In the liquid crystal display device according to the second embodiment of the present invention, a buffer region is formed by removing portions of the gate insulating layer and/or the passivation layer between the dummy column spacer 416 and the sealant 410. When a liquid crystal is dispensed on the substrate and spreads out, it moves to the buffer region through the openings, thereby preventing generation of bubbles even when the liquid crystal is slowly filled. Also, when the liquid crystal is excessively dispensed on the substrate, it is guided to the buffer region through the openings, thereby maintaining a uniform cell gap. The dummy column spacer 416 is formed between the active region 420 and the photo-hardening sealant 410, so that it prevents external substance generated by the photo-hardening sealant 410 from penetrating into the active region 420.

Figure 6:
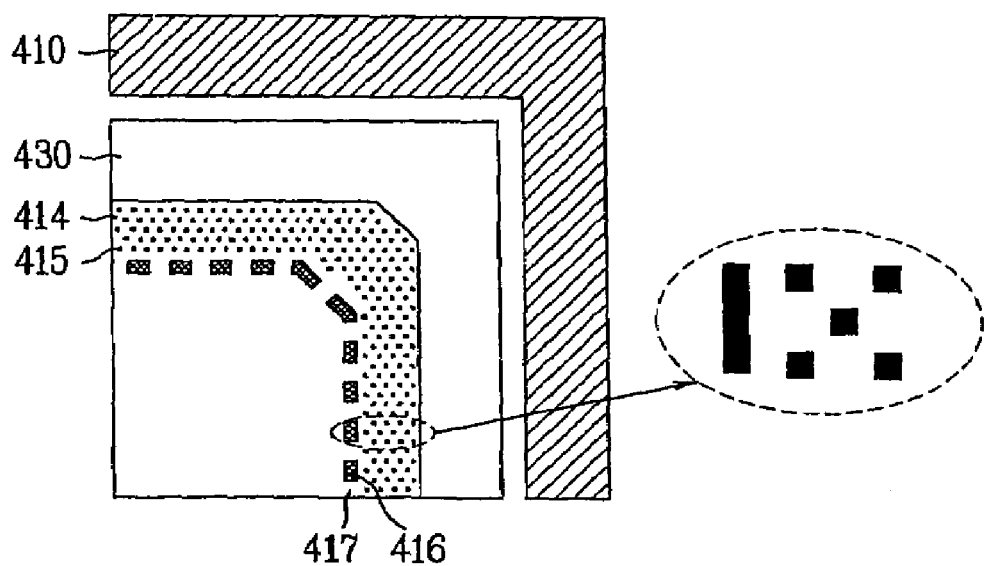
FIG. 6 is an enlarged view of "B" portion of FIG. 3 so as to explain a dummy column spacer in a liquid crystal display device according to a third embodiment of the present invention.

A dummy column spacer and column spacers according to a third embodiment of the present invention will be explained as follows. FIG. 6 is an enlarged view of "B" portion of FIG. 3 so as to explain a dummy column spacer in a liquid crystal display device according to the third embodiment of the present invention.

Referring to FIG. 6, the dummy column spacer 416 having the plurality of openings 417 is formed on the black matrix layer 430 so as to regulate the liquid crystal flow, and dotted column spacers 415 are formed outside the dummy column space 416 toward the sealant 410. Then, the alignment layer 414 is formed on the substrate including the dummy column spacer 416 and the dotted column spacers 415. The dummy column spacer 416 and the dotted column spacers 415 are made of an organic resin material, which may be formed simultaneously or separately. The openings 417 may be formed successively or not.

As mentioned above, the buffer region is formed between the dotted column spacers 415 and the sealant 410 by removing portions of the gate insulating layer and the passivation layer. In the liquid crystal display device according to the third embodiment of the present invention, the dotted column spacer 415 are additionally formed to the dummy column spacer 416 having the openings at corner regions, thereby regulating the liquid crystal flow more effectively. Furthermore, it prevents foreign substance generated by the photo-hardening sealant 410 from penetrating into the active region 420.

Figure 7:
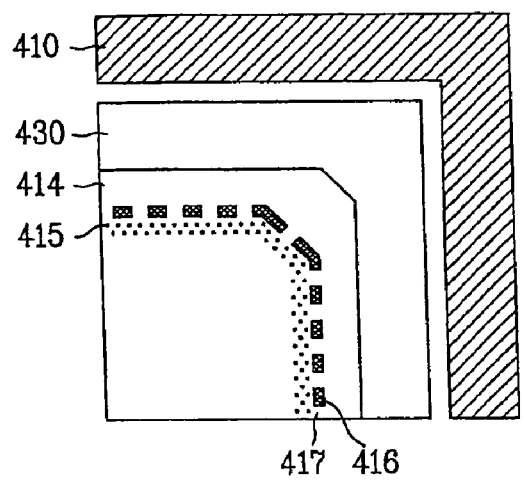
FIG. 7 is an enlarged view of "B" portion of FIG. 3 so as to explain a dummy column spacer in a liquid crystal display device according to a fourth embodiment of the present invention.

A dummy column spacer and column spacers according to a fourth embodiment of the present invention will be explained as follows. FIG. 7 is an enlarged view of "B" portion of FIG. 3 so as to explain a dummy column spacer in a liquid crystal display device according to the fourth embodiment of the present invention. Referring to FIG. 7, the dummy column space 416 having the openings 417 is formed on the black matrix layer 430 so as to regulate the liquid crystal flow, and dotted column spacers 415 are formed inside the dummy column spacer 416 toward the active region 420. Then, the alignment layer 414 is formed on the second substrate including the dummy column spacer 416 and the dotted column spacers 415. An overcoat layer (not shown) may be formed on the black matrix layer 430, and then the dummy column spacer 416 and the dotted column spacers 415 may be formed on the overcoat layer. At this time, the dummy column spacer 416 and the dotted column spacers 415 of an organic resin material may be formed simultaneously or separately. The openings 417 may be formed successively or not.

As mentioned above, the buffer region is formed between the dotted column spacers 415 and the sealant 410 by selectively removing portions of the gate insulating layer and the passivation layer. In the liquid crystal display device according to the fourth embodiment of the present invention, the dotted column spacers 415 are additionally formed to the dummy column spacer 416, thereby regulating the liquid crystal flow more effectively,. In addition, it prevents foreign substances generated by the photo-hardening sealant 410 from penetrating into the active region 420.

The dummy column spacer for regulating-the liquid crystal flow varies with a different structure according to the mode of the liquid crystal display device.

Figure 8:
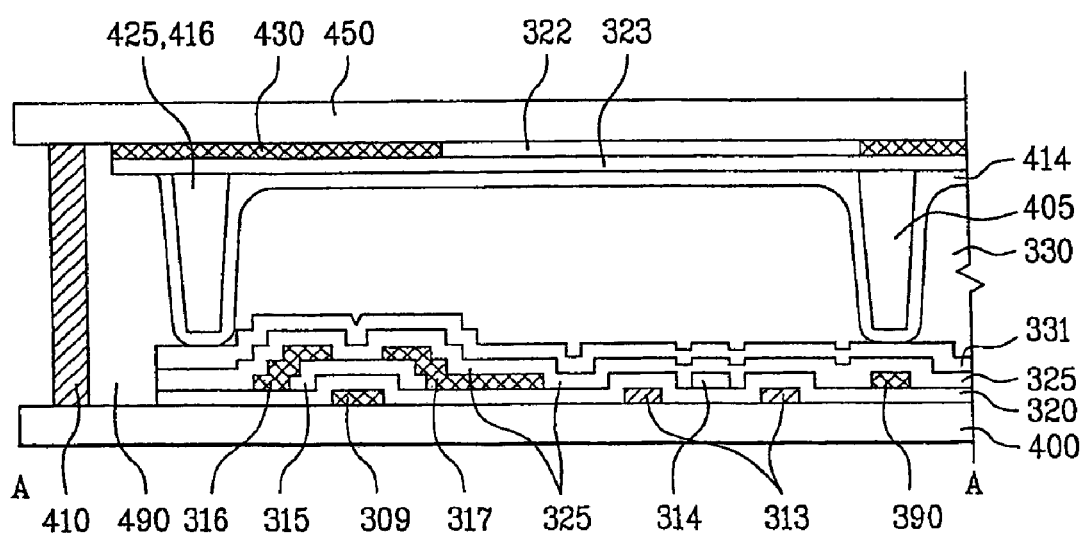
FIG. 8 is a cross-sectional view of an in-plane switching mode liquid crystal display device taken along line A—A of FIG. 3 according to a fifth embodiment of the present invention.

An in-plane switching mode liquid crystal display device according to a fifth embodiment of the present invention will be explained with reference to FIG. 8. In FIG. 8, a metal layer is deposited on the first substrate 400, and a common electrode 313 and a gate line (not shown) having a gate electrode 309 are formed on the first substrate 400 by photolithography. A gate insulating layer 320 is formed on the entire surface of the first substrate 400 including the gate electrode 309 and the common electrode 313. Then, a semiconductor layer 315 is formed on the gate insulating layer 320 on the gate electrode 309.

After that, the data line 390 having source and drain electrodes 316 and 317 on both sides of the semiconductor layer 315 is formed on the gate insulating layer 320, and a pixel electrode 314 is formed in parallel to the common electrode 313 for being connected to the drain electrode in a pixel region. A passivation layer 325 is formed on the first substrate 400 including the pixel electrode 314, and the buffer region 490 is formed by selectively removing portions of the gate insulating layer 320 and the passivation layer 325 between the sealant 410 and the dummy column spacer 416/425 with a mask. Then, a first alignment layer 331 is formed on the passivation layer 325.

Next, the black matrix layer 430 and a color filter layer 322 are formed on the second substrate 450, and an overcoat layer 323 is formed on the entire surface of the second substrate 450 so as to reduce a step coverage between the black matrix layer 430 and the color filter layer 322. At this time, the overcoat layer 323 is formed of one of Cr, CrOx, and black resin.

The column spacer 405 is formed in the active region of the second substrate 450, and the dummy column spacer 416/425 is formed in the periphery (i.e., the outside) of the active region on the overcoat layer 323. The second alignment layer 414 is formed on the column spacer 405 and the dummy column spacer 425, and-then the photo-hardening sealant 410 is deposited thereon. Subsequently, the liquid crystal is dispensed on the first substrate 400 having the alignment layer, and the second substrate 450 is positioned above the first substrate 400. The first and second substrates 400 and 450 are attached to each other. At this time, the sealant may be formed on the first substrate 400.

Figure 9:
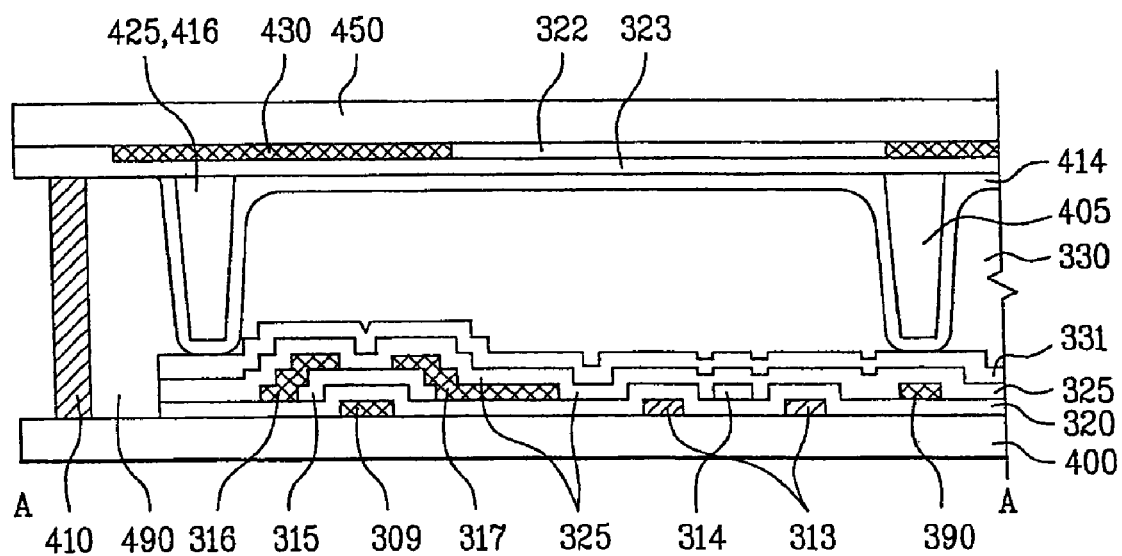
FIG. 9 is a cross-sectional view of an in-plane switching mode liquid crystal display device taken along line A—A of FIG. 3 according to a sixth embodiment of the present invention.

In the in-plane switching mode liquid crystal display device according to the fifth embodiment of the present invention, a portion of the overcoat layer 323 is removed from the second substrate corresponding to the photo-hardening sealant 410. However, the overcoat layer 323 is formed on the entire surface of the second substrate including the photo-hardening sealant 410 in the in-plane switching mode liquid crystal display device according to a sixth embodiment of the present invention, as shown in FIG. 9.

In detail, the black matrix layer 430 and the color filter layer 322 are formed on the second substrate 450, and the overcoat layer 323 is formed on the entire surface of the second substrate 450 so as to reduce a step coverage between the black matrix layer 430 and the color filter layer 322. Then, the column spacer 405 and the dummy column spacer 416/425 are respectively formed in the active region and the periphery (i.e., the outside) of the active region without patterning the overcoat layer 323. The second alignment layer 414 is formed on the column spacer 405 and the dummy column spacer 416/425, and the photo-hardening sealant 410 is deposited on one of the first and second substrates 400 and 450. After dispensing the liquid crystal on the first substrate 400, the second substrate 450 is disposed on the first substrate 400.

Figure 10:
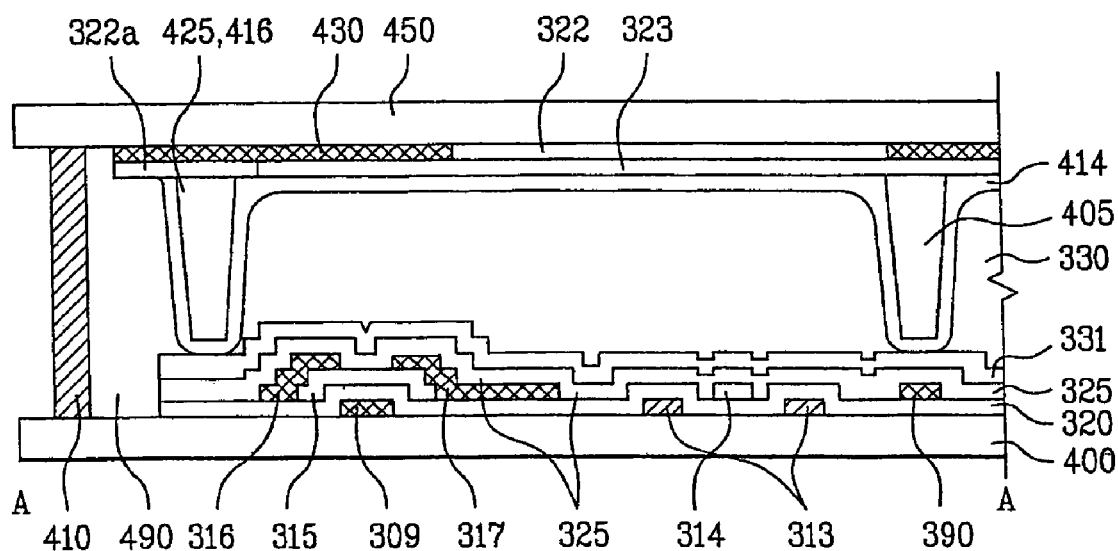
FIG. 10 is a cross-sectional view of an in-plane switching mode liquid crystal display device taken along line A—A of FIG. 3 according to a seventh embodiment of the present invention.

Referring to FIG. 10, the in-plane switching mode liquid crystal display device according to a seventh embodiment of the present invention has same structure as that according to the fifth and sixth embodiments of the present invention except for that the overcoat layer 323 is patterned on the substrate and a dummy color filter layer 322a is connected to the overcoat layer 323.

Figure 11:
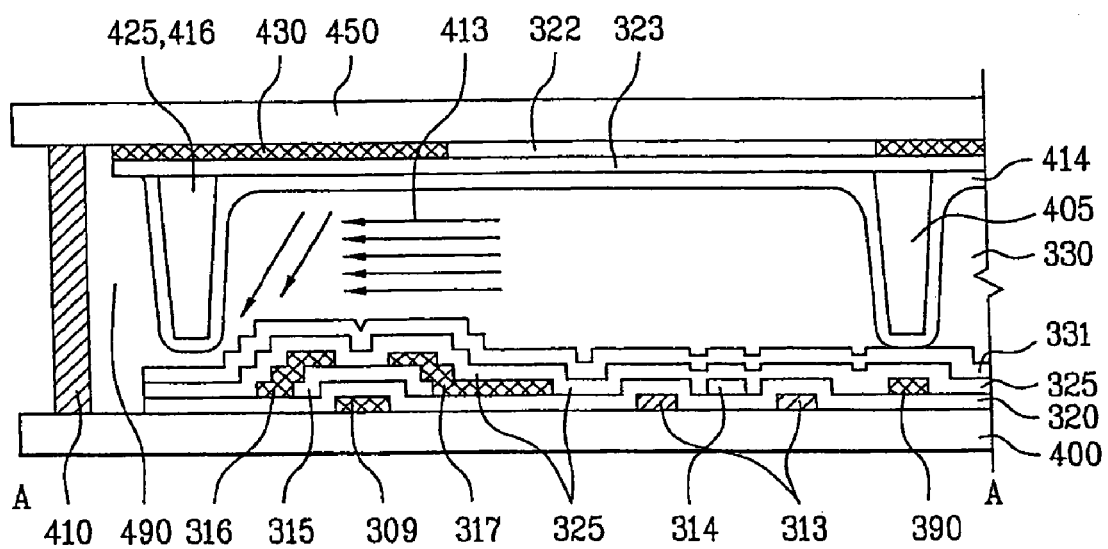
FIG. 11 is a cross-sectional view of an in-plane switching mode liquid crystal display device taken along line A—A of FIG. 3 according to a eighth embodiment of the present invention.

Referring to FIG. 11, the in-plane switching mode liquid crystal display device according to an eighth embodiment of the present invention has same structure as that according to the fifth embodiment of the present invention except for that there is a gap between the dummy column spacer 416/425 and the first substrate 400. The liquid crystal flows into the buffer region 490 between the photo-hardening sealant 410 and the dummy column spacer 416/425 in the active region 420 since the gap is formed between the dummy column spacer and the first substrate, thereby regulating the liquid crystal flow. At this time, the buffer region 490 is formed by selectively removing portions of the gate insulating layer 320 and the passivation layer 325 between the dummy column spacer 416/425 and the photo-hardening sealant 410.

As mentioned above, in the in-plane switching mode liquid crystal display devices according to the fifth, sixth, seventh, and eighth embodiments of the present invention, the common electrode 313 may be formed on the different layer from the pixel electrode 314, or both of them may be formed on the gate insulating layer 320 or on the same layer as the source and drain electrode 316 and 317. Also, the common electrode 313 may be formed on the same layer as the gate electrode 309, and the pixel electrode 314 may be formed on the passivation layer 325. The common electrode 313 and the pixel electrode 314 may be formed on the passivation layer 325. Accordingly, the common electrode 313 and pixel electrode 314 may be disposed in various ways.

During forming the buffer region 490, both the gate insulating layer 320 and the passivation layer 325 may be removed, or only passivation layer 325 may be removed. At this time, if the pixel electrode 314 is formed on the passivation layer 325, the buffer region 490 is formed by removing the passivation layer 325 between the sealant 410 and the dummy column spacer 416/425 so as to connect the pixel electrode 314 to the drain electrode 317 of the thin film transistor when a contact hole is formed in the passivation layer 325. The buffer region 490 may be additionally formed with a mask.

Figure 12:
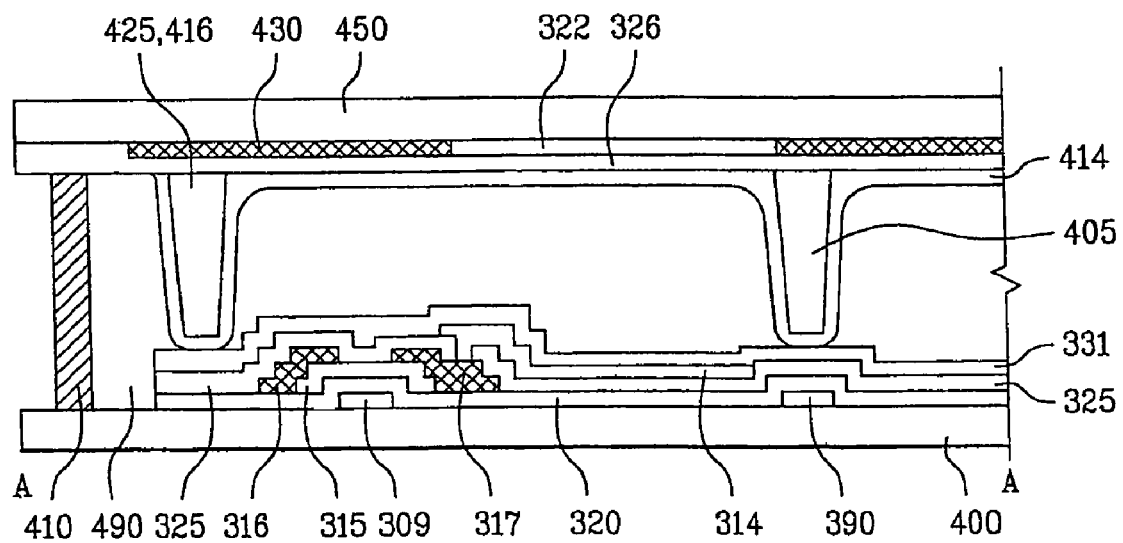
FIG. 12 is a cross-sectional view of a TN mode liquid crystal display device taken along line A—A of FIG. 3 according to a ninth embodiment of the present invention.
Figure 13:
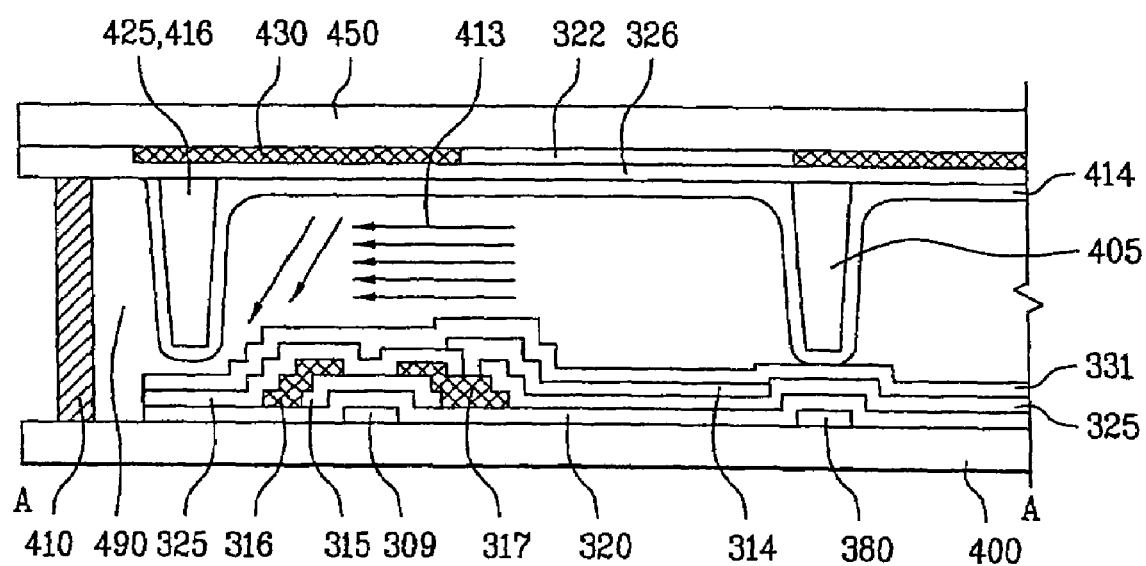
FIG. 13 is a cross-sectional view of a TN mode liquid crystal display device taken along line A—A of FIG. 3 according to a tenth embodiment of the present invention.

FIG. 12 is a cross-sectional view of a TN mode liquid crystal display device taken along line A—A of FIG. 3 according to a ninth embodiment of the present invention. FIG. 13 is a cross-sectional view of a TN mode liquid crystal display device taken along line A—A of FIG. 3 according to a tenth embodiment of the present invention.

The TN mode liquid crystal display device according to the ninth embodiment of the present invention will be explained with reference to FIG. 12. Referring to FIG. 12, a metal layer is deposited on the first substrate 400, and the gate line 380 having the gate electrode 309 is formed on the first substrate 400 by photolithography. Then, the gate insulating layer 320 is formed on the entire surface of the first substrate 400 including the gate electrode 309 and the gate line 380. The semiconductor layer 315 is formed on the gate insulating layer 320 above the gate electrode 309, and a data line (not shown) having the source and drain electrodes 316 and 317 on both sides of the semiconductor layer 315 is formed on the first substrate 400. The passivation layer 325 is formed on the entire surface of the first substrate 400 including the source and drain electrodes 316 and 317. After forming a contact hole on the drain electrode 317, the pixel electrode 314 is formed in the pixel region for being connected to the drain electrode 317 through the contact hole. At this time, portions of the gate insulating layer 320 and the passivation layer 325 between the sealant 410 and the dummy column spacer 416/425 are selectively removed during forming the contact hole, thereby forming the buffer region 490. The buffer region 375 may be formed by removing only the passivation layer 325. The first alignment layer 331 is formed on the entire surface of the first substrate 400 including the pixel electrode 314.

The second substrate 450 includes the black matrix layer 430, the color filter layers 322, the common electrode 326 and the photo-hardening sealant 410. The black matrix layers 430 are formed on the second substrate in order to prevent light leakage out of the liquid crystal display panel, and the color filter layers are formed between the black matrix layers 430. The common electrode 326 is formed on the entire surface of the second substrate 450 including the color filter layer 322 and the black matrix layer 430. Thereafter, the column spacer 405 is formed in the active region 420 of the second substrate 450. Simultaneously, the dummy column spacers 416/425 are formed on the common electrode 326 in the periphery (i.e., the outside) of the active region 420. The second alignment layer 414 is formed on the column spacer 405 and the dummy column spacer 425, and the photo-hardening sealant 410 is deposited in the periphery of the dummy column spacer 416/425. The liquid crystal is dispensed on the first substrate 400 having the alignment layer, and the second substrate 450 is disposed on the first substrate 400 so as to attach the first and second substrates to each other.

The embodiments of the present invention may be applied to various modes of the liquid crystal display, such as a vertical alignment (VA) mode, an optically controlled birefringence (OCB) mode, a ferroelectric liquid crystal (FLC) mode, and a reflective type mode. As shown in FIGS. 8 to 10, the overcoat layer may be formed on the color filter layer 322.

The TN mode liquid crystal display device according to the tenth embodiment of the present invention has same structure as that according to the ninth embodiment of the present invention except for that a gap is formed between the dummy column spacer 416/425 and the first substrate 400 with the predetermined gap. Accordingly, the liquid crystal flows into the buffer region 490 between the photo-hardening sealant 410 and the dummy column spacer 416/425 in the active region 420, thereby regulating the liquid crystal flow 413. At this time, the buffer region 490 is formed by selectively removing portions of the gate insulating layer 320 and the passivation layer 325 between the dummy column spacer 416/425 and the photo-hardening sealant 410.

A method of fabricating a liquid crystal display panel by using a liquid crystal dispensing method will be explained with reference to FIGS. 14A to 14G. A plurality of liquid crystal display panel regions are formed on the first and second substrates, and then a thin film transistor array and a color filter array are respectively formed on the substrates. On completing dispensing the liquid crystal and forming the sealant on the substrate, the substrate is cut into unit liquid crystal display panel regions.

Figure 14A:
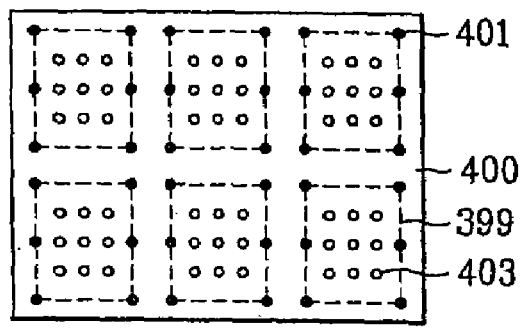
FIGS. 14A to 14G are cross-sectional views illustrating process steps of fabricating a liquid crystal display device according to a liquid crystal dispensing method of the present invention.

Referring to FIG. 14A, a plurality of gate and data lines (not shown) are formed to cross one another on the first substrate 400, thereby defining a plurality of pixel regions. A pixel electrode (not shown) is formed at each pixel region, and a plurality of thin film transistors (not shown) are formed at each crossing point of the gate and data lines for applying signals of the data lines to each pixel electrode according to signals of the gate lines. Also, a common line pattern (not shown) is formed for applying a voltage to a common electrode. At this time, a plurality of liquid crystal display panel regions 399 are formed on the substrate. Then, a plurality of silver (Ag) dots 401 are formed on the common line pattern of each liquid crystal display panel region for being electrically connected to the common line pattern, and a liquid crystal 403 is appropriately dispensed on each liquid crystal display panel region 399.

Figure 14B:
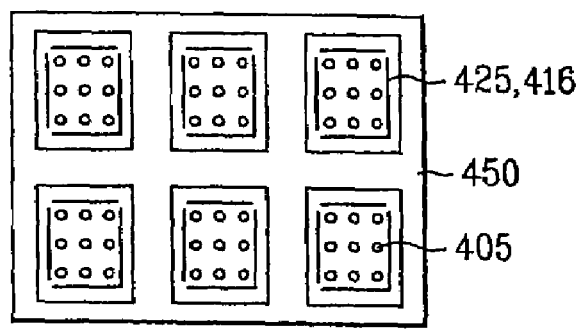
Figure 14C:
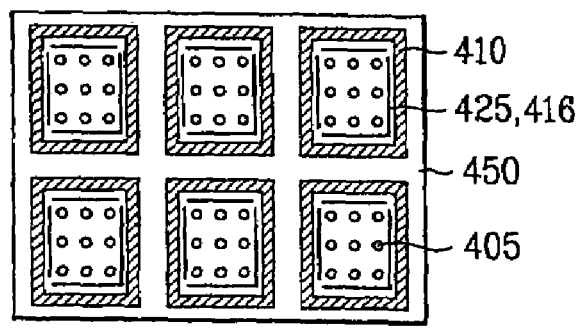

In FIG. 14B, a black matrix layer (not shown), a color filter layer (not shown), and a common electrode (not shown) are formed on the second substrate 450. A column spacer 405 is formed on each liquid crystal display panel region 399 of the second substrate corresponding to the gate and data lines of the first substrate 400. Then, the photo-hardening sealant 410 is deposited in the periphery of each liquid crystal display panel region 399 of the second substrate 450, as shown in FIG. 14C.

Figure 14D:
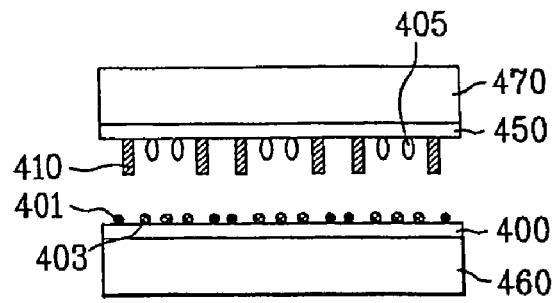
Figure 14E:
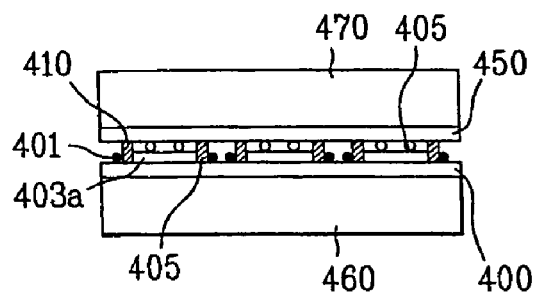

As shown in FIG. 14D, the first substrate is positioned at the lower part, and the second substrate is disposed over the first substrate 400. The first and second substrates 400 and 450 are loaded to a bonding apparatus having a controllable vacuum chamber. The second substrate 450 is fixed to an upper stage 470 that moves along the Z-axis direction (i.e., vertical direction). Also, the first substrate 400 is fixed to a lower stage 460 that moves along the XY-axis direction (i.e., horizontal direction). Subsequently, as shown in FIG. 14E, the second substrate 450 fixed to the upper stage 470 and the first substrate fixed to the lower stage 460 are aligned, and the chamber of the bonding apparatus becomes in a vacuum condition, thereby attaching the first and second substrates 400 and 450 to each other. The first and second substrates are attached to each other with a first gap.

Figure 14F:
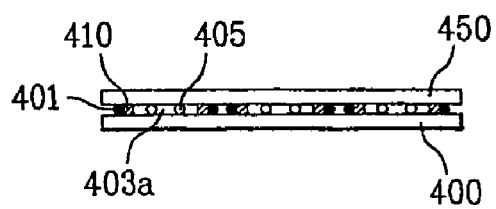
Figure 14G:
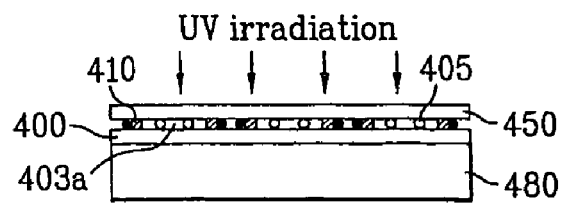

Referring to FIG. 14F, gas or dry air is provided to the-chamber of the bonding apparatus under a vacuum condition so as to make a pressure of the chamber to the atmospheric pressure. Accordingly, the first and second substrates 400 and 450 attached by the sealant 410 are maintained under a vacuum condition, and the circumferential region of the substrates become under the atmospheric pressure, so that the first and second substrates are pressed to each other due to a pressure difference between the inside pressure of the substrates 400 and 450 and the atmospheric pressure. Simultaneously, the liquid crystal 403 spreads out on the entire liquid crystal display panel between the first and second substrates 400 and 450, thereby forming a liquid crystal layer 403a. After that, the UV-ray is irradiated to only photo-hardening sealant from the top of the second substrate 450 so as to harden the photo-hardening sealant 410, as shown in FIG. 14G.

In the liquid crystal display device and method of fabricating the same according to the embodiments of the present invention, it is possible to form the liquid crystal, the sealant, the column spacer, the and dummy column spacer on any one of the first and second substrates. In this case, the substrate having the liquid crystal is disposed at the lower stage of the bonding apparatus, and the other substrate is disposed at the upper stage of the bonding apparatus.

As mentioned above, the liquid crystal display device and method of fabricating the same has the following advantages.

The buffer region is formed by removing portions of the gate insulating layer and the passivation layer between the dummy column spacer and the sealant, so as to regulate the liquid crystal flow. If the liquid crystal is excessively dispensed on the substrate, the liquid crystal flows into the buffer region, thereby accommodating the liquid crystal on the liquid crystal display panel appropriately. Meanwhile, if the amount of the liquid crystal on the substrate is not enough, the liquid crystal moves from other regions to the buffer region, thereby filling the liquid crystal on the liquid crystal display panel appropriately.

It will be apparent to those skilled in the art that various modifications and variations can be made in the liquid crystal display device and the method of fabricating the same of the present invention without departing from the spirit or scope of the inventions. Thus, it is intended that the present invention covers the modifications and variations of this invention provided they come within the scope of the appended claims and their equivalents.

What is claimed is:

1. A liquid crystal display device, comprising:
    A first and a second substrates facing each other, each substrate including a plurality of liquid crystal display panel regions, each liquid crystal display panel region including an active region and a dummy region;
    a sealant outside the liquid crystal display panel regions and bonding the first substrate and the second substrate;
    a dummy column spacer on the dummy region to control a liquid crystal flow;
    a liquid crystal layer between the first and the second substrate, wherein the dummy column spacer includes a plurality of openings; and
    a buffer region created between the sealant and the dummy column spacer to accommodate the liquid crystal.

2. The device of claim 1, wherein the buffer region is formed on the first substrate such that the buffer region is alternatively arranged with at least one of a gate insulating layer and a passivation layer on the first substrate.

3. The device of claim 1, wherein the sealant is at least one of a photo-hardening sealant and a mixture of a photo-hardening sealant and a thermo-hardening sealant.

4. The device of claim 1, further comprising a main column spacer in the active region, wherein the main column spacer includes a same material as the dummy column spacer.

5. The device of claim 4, wherein the main column spacer and the dummy column spacer include at least one of an organic resin material and a photosensitive material.

6. The device of claim 1, wherein the plurality of openings of the dummy column spacer include corner openings at corner regions of the dummy column spacer.

7. The device of claim 6, wherein at least one of the corner openings has a different size.

8. The device of claim 6, wherein at least one of the corner opening is formed at a different time.

9. The device of claim 1, wherein the dummy column spacer is formed to have a shape matching the shape of the liquid crystal display device.

10. The device of claim 1, wherein the dummy column spacer surrounds the active region.

11. The device of claim 1, further comprising dotted column spacers on the dummy column spacer.

12. The device of claim 11, wherein the dotted column spacers are formed between the active region and the dummy column spacer.

13. The device of claim 11, wherein the dotted column spacers are formed between the sealant and the dummy column spacer.

14. The device of claim 1, wherein the dummy column spacer is formed on the second substrate and is separated from the first substrate by a gap.

15. The device of claim 1, further comprising a black matrix layer and an overcoat layer on the second substrate.

16. The device of claim 15, wherein the dummy column spacer is formed on the overcoat layer.

17. A method of fabricating a liquid crystal display device, comprising:
    preparing a first substrate and a second substrate;
    forming a plurality of liquid crystal display panel regions on each substrate;
    forming an active region and a dummy region on each liquid crystal display panel;
    forming a liquid crystal on the active region;
    forming a dummy column spacer on the dummy region to control a liquid crystal flow, the dummy column spacer including a plurality of openings;
    forming a buffer region between the sealant and the dummy column spacer to accommodate the liquid crystal;
    forming a sealant surrounding the liquid crystal display panel regions of one of the first and second substrates; and
    bonding the first substrate and the second substrate.

18. The method of claim 17, wherein forming the buffer region includes forming the buffer region on the first substrate by being alternatively arranged with at least one of a gate insulating layer and a passivation layer on the first substrate.

19. The method of claim 17, wherein the sealant is formed as at least one of a photo-hardening sealant and a mixture of a photo-hardening sealant and a thermo-hardening sealant.

20. The method of claim 17, further comprising forming a main column spacer in the active region, wherein the main column spacer includes a same material as the dummy column spacer.

21. The method of claim 20, wherein the main column spacer and the dummy column spacer include at least one of an organic resin material and a photosensitive material.

22. The method of claim 17, wherein the plurality of openings of the dummy column spacer include corner openings at corner regions of the dummy colunm spacer.

23. The method of claim 22, wherein at least one of the corner openings has a different size.

24. The method of claim 22, wherein at least one of the corner opening is formed at a different time.

25. The method of claim 17, wherein forming the dummy column spacer includes forming the dummy column spacer to have a shape matching the shape of the liquid crystal display device.

26. The method of claim 17, wherein the dummy column spacer surrounds the active region.

27. The method of claim 17, further comprising forming dotted column spacers on the dummy column spacer.

28. The method of claim 27, wherein the dotted column spacers are formed between the active region and the dummy column spacer.

29. The method of claim 27, wherein the dotted column spacers are formed between the sealant and the dummy column spacer.

30. The method of claim 17, wherein the dummy column spacer is formed on the second substrate and is separated from the first substrate by a gap.

31. The method of claim 17, further comprising forming a black matrix layer and an overcoat layer on the second substrate.

32. The method of claim 31, wherein the dummy column spacer is formed on the overcoat layer.

33. The method of claim 17, wherein the bonding the first and second substrates includes:
    loading the first and second substrates to a bonding apparatus;
    forming a vacuum condition in the bonding apparatus;
    aligning the first and second substrates;
    attaching the first and second substrates to each other by the sealant; and pressing the first substrate to the second substrate by maintaining the bonding apparatus as the vacuum state.

* * * * *